United States Patent [19]

Schulze

[11] 4,302,276

[45] Nov. 24, 1981

[54] MACHINE FOR WELDING A MOVING WEB OF MATERIAL BY MEANS OF A MOVABLE WELDING TOOL

[75] Inventor: Ehrhart Schulze, Fellbach, Fed. Rep. of Germany

[73] Assignee: Karl Heinz Steigler, Stuttgart, Fed. Rep. of Germany

[21] Appl. No.: 153,871

[22] Filed: May 28, 1980

[30] Foreign Application Priority Data

Jan. 6, 1979 [DE] Fed. Rep. of Germany ....... 2922438

[51] Int. Cl.³ ............................................. B16H 3/00
[52] U.S. Cl. .................................... 156/553; 74/352; 156/555; 156/582; 156/583.1; 156/583.91
[58] Field of Search ............... 156/543, 553, 555, 582, 156/583.1, 583.5, 583.91; 74/342, 352, 356, 358, 359, 413, 420, 421 R

[56] References Cited

U.S. PATENT DOCUMENTS

| | | | |
|---|---|---|---|
| 1,780,858 | 11/1930 | Bearens | 74/359 |
| 2,467,879 | 4/1949 | Billeb | 156/553 |
| 2,882,956 | 4/1959 | Weist | 156/555 |
| 2,907,221 | 10/1959 | Haupt | 74/352 |
| 2,958,366 | 11/1960 | Conti | 156/553 |

Primary Examiner—Caleb Weston
Attorney, Agent, or Firm—Hopgood, Calimafde, Kalil, Blaustein & Judlowe

[57] ABSTRACT

An apparatus for welding a web of material which is being moved in its longitudinal direction is disclosed. The apparatus comprises a movable welding tool which welds along a line of contact against the periphery of a rotatable counter-roller, and a drive means which imparts rotary movement to the counter-roller and moves the welding tool periodically into its welding position. The apparatus further comprises a means for superimposing on the counter-roller rotation an additional rotation such that the point of weld contact on the counter-roller is distributed equally around the periphery of said roller.

9 Claims, 5 Drawing Figures

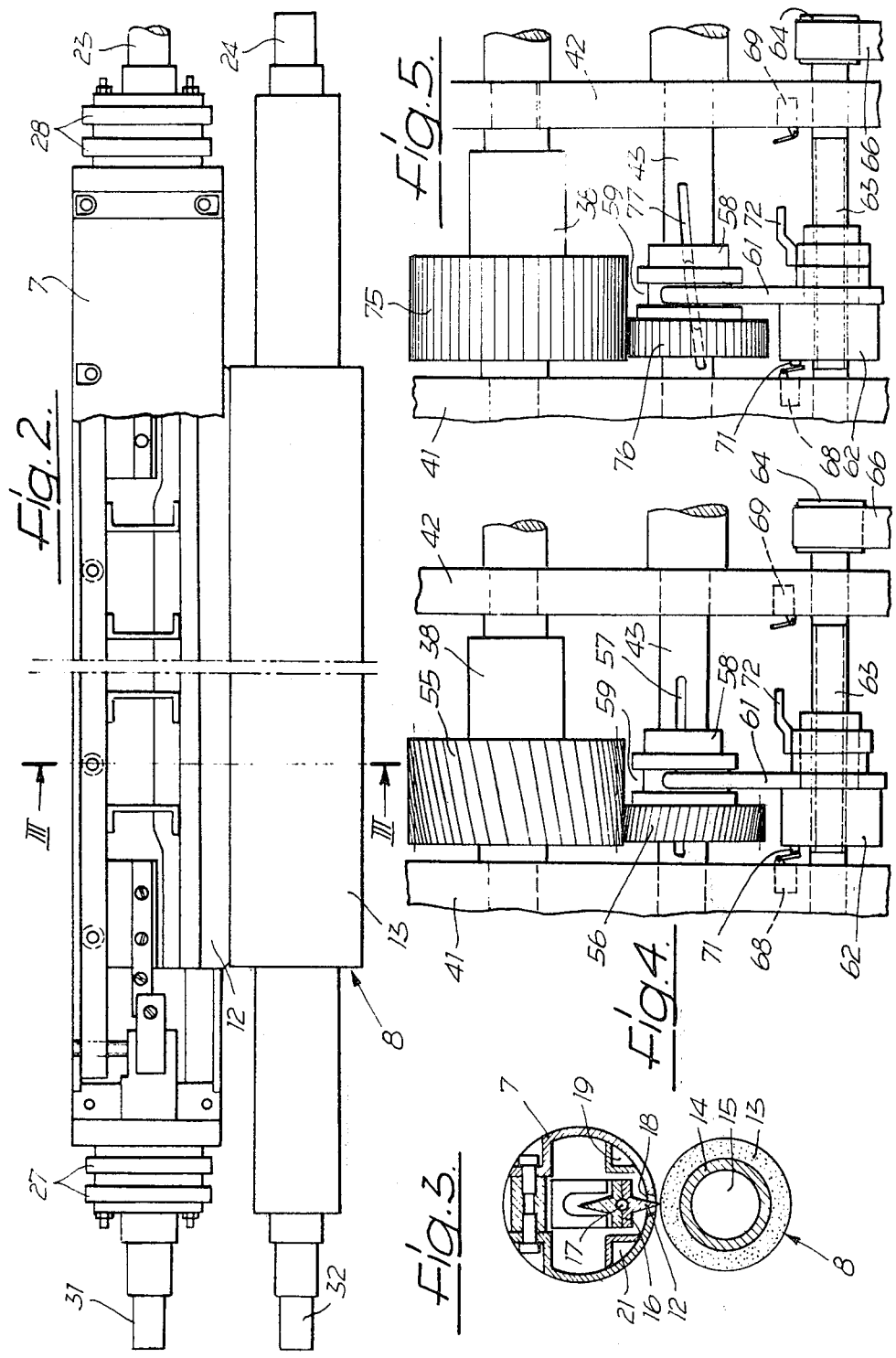

MACHINE FOR WELDING A MOVING WEB OF MATERIAL BY MEANS OF A MOVABLE WELDING TOOL

FIELD OF INVENTION

The present invention relates to a machine for welding a web of material which is being moved in its longitudinal direction using a movable welding tool which presses the web of material substantially along a line of contact against the periphery of a rotatable counter-roller, the machine having a drive which imparts a rotary movement to the counter-roller and moves the welding tool periodically into its welding position in contact with the web of material. The apparatus has a first transmission shaft which controls the movement of the welding tool and a second transmission shaft which controls the rotation of the counter-roller and a transmission which couples the movement of the welding tool with the rotation of the counter-roller.

DESCRIPTION OF THE PRIOR ART

Machines of this type are already known and are used for the manufacture of plastic bags, in which separation welding processes are carried out on a two-ply web of thermoplastic resin. Upon the operation of these machines the hot welding edge of the welding tool presses the covering of the counter-roller together in the region of the contact line and leaves linear indented traces on the elastic coating thereof, which normally consists of a tetrafluorethylene glass fabric. The linear loads applied to the counter-roller, if 300 welds per minute or more are to be effected, constitute a high mechanical and thermal stress on the counter-roller so that it is desirable to distribute the impression lines in as uniformly distributed and well defined a manner as possible over the entire periphery of the counter-roller.

In a welding machine disclosed in Swiss Pat. No. 515,107, in order to obtain a complete covering of the jacket of the counter-roller by the welding tool, the counter-roller is surrounded by a sleeve of tetrafluorethylene-impregnated fiberglass cloth which is arranged "freely floating" on said counter-roller. This floating arrangement allows the sleeve to turn at random with respect to the anvil region of the counter-roller so that a different peripheral region of the floating sleeve will constantly offer itself to the welding edge in the anvil region where the welding edge acts on the counter-roller. However, since the movement of the sleeve which surrounds the counter-roller is random, there is no assurance that the contact lines will be distributed uniformly on the sleeve. As stated in the Swiss patent, the object thereof is merely to provide a narrow packaging machine of only slight output. In view of this low output, operation with a counter-roller whose periphery is not elastically deformed may be possible. In larger welding machines of high output capacity, however, the imprinting of the welding edge into an elastic counter support is absolutely necessary in order to obtain a longer time of contact. The embodiment shown in the said Swiss patent with a floating sleeve surrounding the anvil strip of the counter-roller can for this additional reason not be used in welding machines of higher capacity.

SUMMARY OF THE INVENTION

In one embodiment of the present invention the linear loads on the counter-roller is distributed evenly by means of two transmission members of a transmission, both of which transmit rotary movement and are in engagement with each other via an oblique toothing and are adapted to be axially displaced relative to each other by means of a displacement device. By the relative axial displacement an additional rotary movement is superimposed on the rotary movement which is caused by the drive and transferred by the transmission. In this manner it is possible to utilize those peripheral regions of the counter-roller which are located between adjacent contact lines and which are otherwise not used.

In one preferred embodiment two obliquely toothed intermeshing spur gears are provided on the transmission members and coupled via their oblique toothing. One of the spur gears is preferably fixed on a first shaft and made so wide that the other narrower spur gear, which is seated in axially displaceable non-rotatable manner on a second shaft can be axially displaced without the two spur gears coming out of mesh with each other.

In one preferred embodiment, the width of the one spur gear and the length of path of the displacement of the narrow spur gear, as well as the bevel of the toothing of the spur gears, are so selected that the relative rotation produced upon one complete axial displacement corresponds to one spacing of the toothing of the spur gears.

In another embodiment the function of the oblique toothing is accomplished by means of a spiral groove located in a shaft on which there is seated a gear wheel which is axially displaceable with respect to the shaft and in engagement with the groove.

The object of the present invention is to provide an apparatus which assures that the linear loads on the surface of the counter-roller applied by the welding edge of the welding tool are distributed uniformly over the entire periphery of the counter-roller.

DESCRIPTION OF THE DRAWINGS

The invention will be explained in detail below with reference to the drawing in which:

FIG. 2 is a view of the welding roller and of the counter-roller of the machine, the welding roller being shown broken away in part, FIG. 3 is a section along the line III—III of FIG. 2, FIG. 4 shows on a large scale, broken away, a portion of the gearing with gearing members connected with each other via a helical toothing, in accordance with a first embodiment of the machine, and FIG. 5 is a view of a second embodiment corresponding to FIG. 4.

DESCRIPTION OF THE PREFERRED EMBODIMENT

Figure 1:
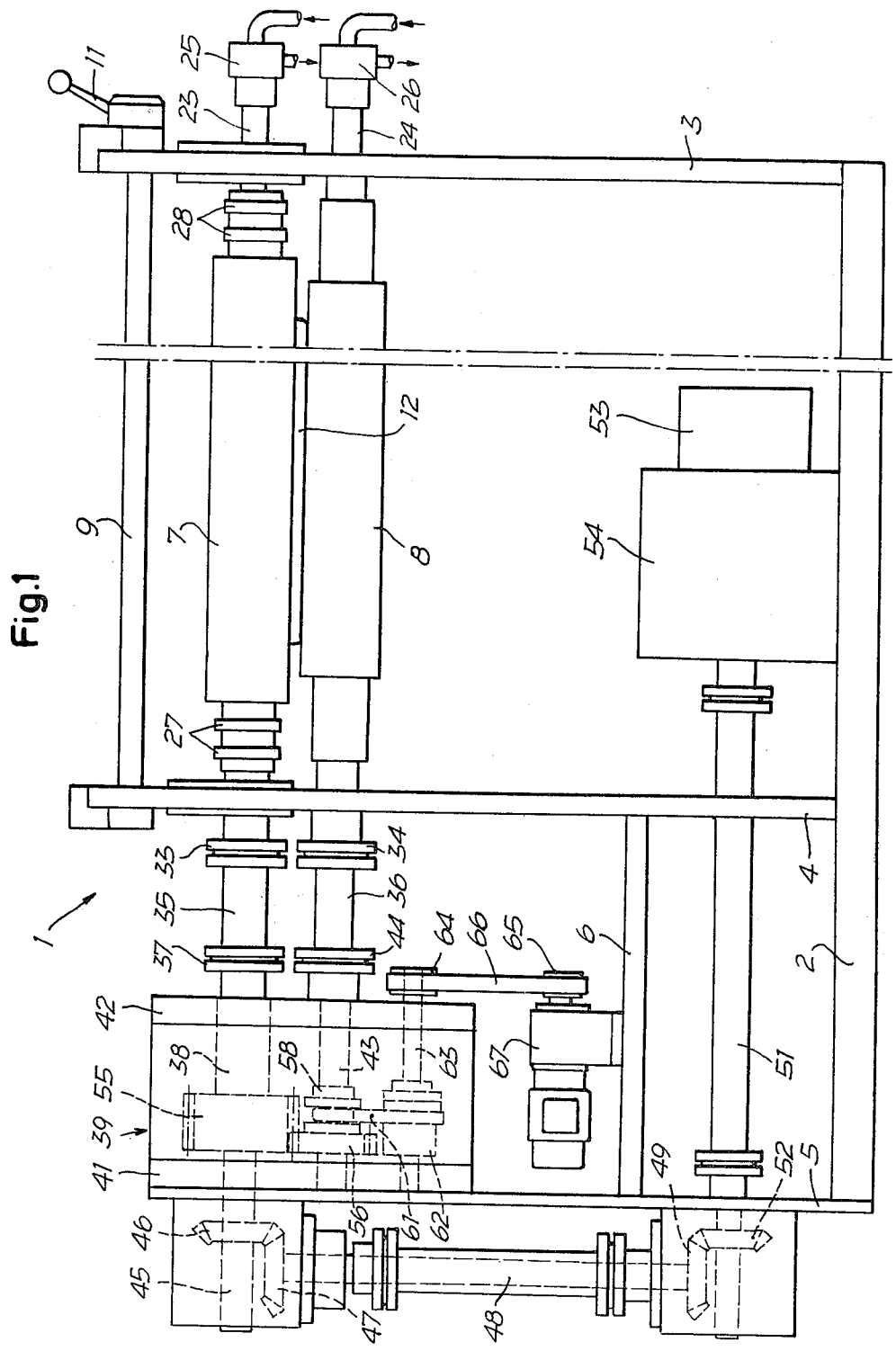
FIG. 1 is a diagrammatically simplified view of one embodiment of the machine.

FIG. 1 shows a machine designated generally as 1 by means of which welding processes can be carried out on thermoplastic sheeting in order, for instance, to produce plastic bags. The machine 1 has a base 2 on which the side walls 3, 4 and 5, forming the machine frame, extend upward. Side walls 4 and 5 are connected together by a cross member 6. Between side walls 3 and 4 a welding roller 7 and a counter-roller 8 are supported for rotation, their construction being shown in greater detail in FIGS. 2 and 3. Above welding roller 7 an adjustment shaft 9 is mounted on the machine frame such that the shaft can be turned by means of a handle 11 making it possible, by an eccentric device (not shown) to effect the adjustment of the distance of the welding roller 7 from the counter-roller 8 which is desired for a given period of welding.

As can be noted in particular from FIGS. 2 and 3, the counter-roller 8 is provided with a covering 13 for cooperation with a heated welding edge 12 of the welding roller 7, said cover being a rubber blanket with teflon glass-cloth covering. The covering is seated on a steel sleeve 14 which surrounds an inner hollow space 15 which is filled with heated thermal oil.

The welding edge 12 extends from ledge 16, which is heated by means of a heating cartridge 17, outwards through a slot 18 which is cut in the shell of welding roller 7 (FIG. 3). From FIG. 3 it can be seen that cooling channels 19 and 21 are provided on the inside of the shell of the welding roller, adjacent the slot 18, through which cooling water flows during operation, it being fed and discharged through coolant boreholes which discharge to the outside via journal pin 23 located to the right in FIG. 2. Journal pin 24 of the counter-roller 8 is also provided with corresponding bore holes which are also not shown and which serve for the feeding and discharge of the thermal oil into and out of the hollow space 15. In FIG. 1 rotating connection couplings 25 and 26 are shown on journal pins 23 and 24 respectively, these couplings serving for the feeding and removal of coolant for welding roller 7 and for the feeding and removal of the thermal oil for counter-roller 8. Welding roller 7 is further provided with two pairs of slip rings 27 and 28 for the electrical connection of the heating cartridge 17 and of temperature sensors, respectively.

On their journal pins 31 and 32 located in the left in FIG. 2 welding roller 7 and counter-roller 8 are connected for rotation via couplings 33 and 34 respectively with intermediate shafts 35 and 36 (FIG. 1). Intermediate shaft 35 is connected for rotation via a coupling 37 with a first gear shaft 38 of gearing 39. The couplings 33 and 37 are rotationally rigid but allow for shaft displacement within certain limits and thus an adjustment of the position of the welding roller 7 relative to the counter-roller 8 by means of the adjustment shaft 9 is possible.

Gearing 39 with its bearing lids 41 and 42 serves to transmit a rotary movement from the first gear shaft 38, which is connected for rotation with the welding roller 7, to a second gear shaft 43 which is connected for rotation via a coupling 44 with the intermediate shaft 36 and accordingly with the counter shaft 8. The first gear shaft 38 serves as a drive-end gear shaft and has a shaft section 45 which extends outward beyond the bearing cover 41, a bevel gear 46 being fastened on said shaft section. The bevel gear 46 meshes with bevel gear 47 which is fixably attached to the upper end of shaft 48. To the lower end of shaft 48 there is fastened another bevel gear 49 which meshes with still another bevel gear 52 fastened to a main drive shaft 51. Main drive shaft 51 is driven by a drive motor 53 via an intermediate transmission 54 of the type which permits a constant speed of rotation of the drive motor 53 to be maintained while allowing the speed of the main drive shaft 51 to be driven with non-uniform rotation.

For the transmission of rotation of the transmission shaft 38 to the transmission shaft 43 spur gears 55 and 56 which mesh with each other are provided in the gearing 39, the spur gear 55 being wide and fixably attached to the transmission shaft 38. Spur gear 56, which is connected for rotation with the transmission shaft 43 is, on the other hand, narrower. Welding edge 12 of welding roller 7 moves, on a given radius $r_k$, over the path $2 \cdot r_k \cdot \pi$ per revolution of the welding roller. In the embodiment shown, spur gear 55 has the pitch circle diameter $2r_k$ and an even number of teeth. Counter-roller 8 has a smaller diameter than the value $2r_k$ and spur gear 56 in the embodiment shown, has an odd number of teeth. This arrangement results in the number of contact lines between welding edge 12 and covering 13 being equal to the number of teeth of spur gear 56. In addition, the distances between the contact lines on covering 13 correspond approximately to the tooth pitch. With the use of an even number of teeth on both spur gears 55 and 56 the distance between the contact lines would be doubled.

In order to achieve a complete loading of covering 13 of counter-roller 8 over its entire periphery, an obliquely toothed engagement is provided in the course of the transmission of power between transmission shaft 38 and transmission shaft 43 in gearing 39. Furthermore, a means for axially displacing the transmission members with the obliquely toothed engagement relative to each other is provided. The axial movement superimposes on the rotation transmitted from the drive-end transmission shaft 38 to the driven-end transmission shaft 43 an additional rotation.

In the first embodiment shown in FIGS. 1 and 4 for the obliquely toothed engagement spur gears 55 and 56 are developed as obliquely toothed spur gears, see in particular FIG. 4. The wide spur gear 55 is arranged in an axially, non-displaceable manner on the drive-side transmission shaft 38. The narrower, obliquely toothed spur gear 56, is arranged fixed for rotation but axially displaceable on the driven-side transmission shaft 43 which is provided with a keyway 57 parallel to its axis. Spur gear 56 has a hub part 58 in which an annular groove 59 is developed. Groove 59 engages push fork 61 of a displacement device for the axial displacement of the obliquely toothed spur gear 56 on the transmission shaft 43. Push fork 61 is connected with a nut 62 which is seated on a threaded spindle 63. By means of belt pulleys 64 and 65 over which a toothed belt 66 travels, threaded spindle 63 can be driven in both directions of rotation by means of a reversible motor-transmission unit 67 so that obliquely toothed spur gear 56 is moved axially in operation periodically back and forth over the width of obliquely toothed spur gear 55. For reversing the rotation of the motor-transmission unit 67 and thus of threaded spindle 63, there are provided limit switches 68 and 69 which cooperate with stops 71 and 72 respectively on nut 62.

In order to assure a particularly tilt-free guidance of the push fork 61, guide bars (not shown), on which the push fork 61 is guided, can be provided on both sides of threaded spindle 63.

In the embodiment shown in FIG. 1 transmission 39 is so designed that, without axial displacement of the obliquely toothed spur gears 55, 56 relative to each other, the welding edge produces contact lines on the counter-roller which are at a distance apart from each other which corresponds to the tooth pitch. By axial displacement of the spur gear 56 by means of the displacement device, an additional rotary movement is superimposed on the normal rotation of the transmission shaft 43 due to the obliqueness of the toothing. This superimposed rotation results in the contact lines on the counter-roller 8 filling in the gaps which would result upon operation of the machine without axial displacement of spur gear 56. The obliqueness of the helical toothing of the spur gears 55, 56 and the speed of rotation of the threaded spindle 63 of the displacement device are selected in proportion to the speed of the rotation of the welding roller 7 so that from welding process to welding process there is obtained a displacement of the line of contact of about 0.1 mm due to the additional superimposed rotation. Since the width of the narrowest welding seam to be produced is about 0.1 mm and since the width of the contact lines on the counter-roller 8 are greater than 0.1 mm, a gap-free covering of the periphery of the counter-roller 8 is obtained.

In the second embodiment shown in FIG. 5, instead of the obliquely toothed spur gears 55 and 56 of the first embodiment, there are provided spur gears 75 and 76 with straight toothing, spur gear 75 being wide and arranged fixed for rotation and axially non-displaceable on transmission shaft 38. Straight-toothed spur gear 76, like the obliquely toothed spur gear 56 in the first embodiment, is made narrower and is arranged in an equally displaceable manner on the transmission shaft 43. In order to form the obliquely toothed engagement a spiral groove 77 is provided in transmission shaft 43 rather than the axis-parallel keyway 57 of the first embodiment, and the axially displaceable gear wheel 76 is connected for rotation with said spiral groove via a key. On the basis of this oblique toothing formed by spiral groove 77 in combination with the key of spur gear 76 there is obtained in corresponding fashion a superimposed additional rotation when the narrower spur gear 76 is moved axially back and forth over the width of the spur gear 75.

Since from the foregoing the construction and advantage of the device may be readily understood, further explanation is believed to be unnecessary. However, since numerous modifications will readily occur to those skilled in the art after a consideration of the foregoing specification and accompanying drawings, it is not intended that the invention be limited to the exact construction shown and described, but all suitable modifications and equivalents may be resorted to which fall within the scope of the appended claims. Having described the invention,

What I claim is:

1. An apparatus for welding a web of material moving in its longitudinal direction comprising a movable welding tool which is adapted to press the web of material against the periphery of a rotatable counter-roller substantially along a contact line during welding, said apparatus further comprising a drive means for imparting a rotary movement to the counter-roller and simultaneously moving the welding tool periodically into its welding position in contact with the web of material, said drive means having a transmission means with an obliquely toothed engagement means for coupling said welding tool and said counter-roller, said engagement means adapted to be displaced within said transmission means by a displacement means for providing an additional rotation to the said counter-roller relative to said welding tool.

2. An apparatus according to claim 1, wherein said drive means having a first transmission shaft adapted to control the movement of the welding tool and a second transmission shaft adapted to control the rotary movement of the counter-roller, and wherein said transmission means couples said first and said second transmission shafts.

3. An apparatus according to claim 2, wherein the engagement means comprises two obliquely toothed spur gears.

4. An apparatus according to claim 3, wherein the two spur gears are connected for rotation respectively with said first transmission shaft and said second transmission shaft, the first transmission shaft serving as a drive-end shaft and the second transmission shaft as driven-side shaft.

5. An apparatus according to claim 4, wherein the first obliquely toothed spur gear located on the first drive-side transmission shaft is rigidly connected thereto and the second transmission shaft is provided with a spline shaft having an axial-parallel keyway on which said second obliquely toothed spur gear is arranged for axial displacement.

6. An apparatus according to claim 5, wherein the fixed drive-end spur gear is wider than the axially displaceable spur gear and the width of said drive-end spur gear, the path length of the displacement motion of the narrow spur gear produced by the displacement means and the incline of the helical toothing are all so selected such that the relative rotation produced upon a complete axial displacement corresponds to one division of the toothing of said spur gears.

7. An apparatus according to claim 6, wherein the rate of displacement of said second spur gear is so selected in proportion to the speed of rotation of the driven-side transmission shaft that for each revolution of said counter shaft there is superimposed on its rotation an additional rotation, the angle of said additional rotation corresponding to an arc length measured on the periphery of the counter-roller, the size of which is less than the width of the narrowest weld seam to be produced by the machine.

8. An apparatus according to claims 6 or 7, wherein the displacement means comprises a threaded spindle which can be driven in both directions of rotation and on which there is seated a nut which engages a driver member extending radially from said nut and into an annular groove provided on hub of the driven-end of said second spur gear.

9. An apparatus according to claim 1, wherein said obliquely toothed engagement means is developed in the form of a helical groove located on a shaft on which there is seated a gear wheel, said gear wheel being adapted to be displaced axially relative to the shaft and in engagement with the said helical groove.

* * * * *